US007981393B2

(12) United States Patent
Vörde et al.

(10) Patent No.: US 7,981,393 B2
(45) Date of Patent: Jul. 19, 2011

(54) METHOD OF PRODUCING SALTS OF DINITRAMIDIC ACID

(75) Inventors: Carin Vörde, Karlskoga (SE); Henrik Skifs, Karlskoga (SE)

(73) Assignee: Försvarets Materielverk, Stockholm (SE)

( * ) Notice: Subject to any disclaimer, the term of this patent is extended or adjusted under 35 U.S.C. 154(b) by 201 days.

(21) Appl. No.: 10/586,991

(22) PCT Filed: Jan. 21, 2005

(86) PCT No.: PCT/SE2005/000060

§ 371 (c)(1), (2), (4) Date: Jul. 21, 2006

(87) PCT Pub. No.: WO2005/070823

PCT Pub. Date: Aug. 4, 2005

(65) Prior Publication Data

US 2008/0226533 A1 Sep. 18, 2008

(30) Foreign Application Priority Data

Jan. 21, 2004 (SE) ...................................... 0400117

(51) Int. Cl.
*C01B 21/20* (2006.01)

(52) U.S. Cl. ..... 423/387; 423/385; 423/400; 149/109.6; 149/122; 564/107; 564/109; 564/59; 564/58; 564/61

(58) Field of Classification Search .................. 423/387, 423/385, 400, 406; 564/59, 58, 107, 109, 564/61; 149/109.6, 88, 122
See application file for complete search history.

(56) References Cited

U.S. PATENT DOCUMENTS 2,884,437 A * 4/1959 Roberts .......................... 558/39
4,559,409 A * 12/1985 Seyerl ............................ 564/59
5,198,204 A * 3/1993 Bottaro et al. ................ 423/385
5,254,324 A * 10/1993 Bottaro et al. ................ 423/263
5,316,749 A * 5/1994 Schmitt et al. ................ 423/385
5,415,852 A * 5/1995 Schmitt et al. ................ 423/385
5,659,080 A * 8/1997 Suzuki et al. ................ 564/109
5,976,483 A * 11/1999 Langlet et al. ................ 423/385
6,117,255 A * 9/2000 Blomquist ...................... 149/36
6,291,711 B2 * 9/2001 Langlet .......................... 564/59
6,787,119 B2 * 9/2004 Choudary et al. ............ 423/387

FOREIGN PATENT DOCUMENTS

EP 1 344 748 A1 9/2003
WO WO 93/16002 8/1993
WO WO 97/06099 2/1997
WO WO 99/46202 9/1999
WO WO 9946202 A1 * 9/1999

OTHER PUBLICATIONS

U. Bemm et al, "Fox-12, A New Energetic Material with Low Sensitivity for Propellants and Explosives Applications"; Conference Proceedings, NDIA 1998, Insensitive Munitions & Energetic Materials Technology Symposium, San Diego, Nov. 16-19, 1998.

* cited by examiner

*Primary Examiner* — Jennifer K. Michener
*Assistant Examiner* — Heng M Chan
(74) *Attorney, Agent, or Firm* — Jacobson Holman PLLC

(57) ABSTRACT

A method of preparing salt of dinitramidic acid, comprising nitration of an initial compound with a nitrating acid mixture to form dinitramidic acid in a reaction mixture. A positive ion is added to the reaction mixture and forms with the dinitramide ion an ion pair complex which precipitates in the acidic reaction mixture, and the precipitate is separated from the mixture. The remaining spent acid can be reprocessed for recovery of acid for preparation of a new nitrating acid mixture. The preferred positive ion is the guanylurea ion which gives a precipitate of guanylurea dinitramide. The precipitate can be used as starting material for preparation of other dinitramide salts, such as KDN and ADN. The guanylurea ion can be formed in situ in the process by cyanoguanidine being reacted with the reaction mixture.

20 Claims, No Drawings

METHOD OF PRODUCING SALTS OF DINITRAMIDIC ACID

This is a nationalization of PCT/SE05/000060 filed Jan. 21, 2005 and published in English.

The invention relates to production of salt of dinitramidic acid comprising nitration of an initial compound with a nitrating acid mixture to form dinitramidic acid in a reaction mixture.

EP 843 647 discloses a method in which an initial substance is nitrated with a nitrating acid mixture at a temperature of −25° C. or below to form dinitramidic acid in the reaction mixture. The initial substance is selected from a group consisting of $NH_2NO_2$, $NH_4NH_2CO_2$, $NH_2SO_3H$, $NH(SO_3H)_2$, $N(SO_3H)_3$, reaction products of ammonia and sulphur trioxide, and salts thereof with metal cations, ammonium and organic cations. The nitrating acid is selected from a group consisting of nitric acid/sulphuric acid ($HNO_3/H_2SO_4$), nitric acid/oleum ($HNO_3/H_2SO_{4/SO3}$), nitric acid/sulphuric trioxide ($HNO_3/SO_3$), nitric acid/perchloric acid ($HNO_3/HClO_4$), nitric acid/phosphoric acid ($HNO_3/H_3PO_4$), nitric acid/diphosphorus pentoxide ($HNO_3/P_2O_5$), nitric acid/acetic acid, nitric acid/acetic anhydride, nitric acid/trifluoroacetic acid and nitric acid/trifluoroacetic anhydride.

The dinitramidic acid is not stable in the reaction mixture and, during reaction, the dinitramidic acid concentration rises to a maximum and then falls. The reaction mixture is therefore neutralised with a base after a certain reaction time, and the dinitramide ion stabilised as a salt in solution. The dinitramidic acid content is monitored in the course of reaction using UV spectroscopy so that the reaction can be interrupted when an optimal content has been achieved. Then the dinitramide salt can be recovered from the solution using an adsorption agent that adsorbs the dinitramide salt.

A drawback of the known method is that the amount of waste is large and the consumption of nitrating acid is high. An object of the present invention is to provide an alternative method that allows the amount of waste to be reduced significantly and acid to be recovered for preparing new nitrating acid.

This is achieved by a method as defined in the claims.

In the method according to the invention, nitration can be performed in the same way, using the same initial substances and nitrating agent as disclosed in EP 843 647. However, the method is generally applicable to nitrations that are made using a nitrating acid mixture and results in dinitramidic acid in a reaction mixture containing spent acid. A preferred nitrating agent according to the invention is a mixture of $HNO_3$ and $H_2SO_4$, and the potassium or ammonium salt of the sulfamic acid is preferred as the initial substance.

A characteristic feature of the invention is that the reaction mixture is not neutralised after a certain reaction time but instead a positive ion is added, which with the dinitramide ion forms an ion pair complex which precipitates in the acid reaction mixture. The precipitate is separated from the mixture and the remaining spent acid can be reprocessed for recovery of acid. The recovered dinitramide salt can be used as energetic material and/or be used as initial material for preparation of other dinitramide salts.

The positive ion is to form a sparingly soluble ion pair complex with the dinitramide ion, but may otherwise be of an arbitrary type. Ions are particularly preferred which originate from basic nitrogen compounds as ring compounds or chain compounds with one or more nitrogens and one or more carbons. The basic nitrogen compound can be, for example, different derivatives of guanidine which form salts that are sparingly soluble in water.

According to a preferred embodiment, the positive ion is the guanylurea ion. The precipitate which is then obtained, guanylurea dinitramide [1], is an energetic material which is highly insensitive to impact and friction, has high thermal stability and storage stability. Isolating the dinitramide ion in the form of guanylurea dinitramide is therefore very advantageous from the viewpoint of handling, and the compound is well suited as initial material for preparation of other dinitramide salts. Guanylurea dinitramide has previously been prepared from ammonium dinitramide and its properties are described in U. Bemm et al. "FOX-12, A New Energetic Material with Low Sensitivity for Propellants and Explosives Applications"; Conference Proceedings, NDIA 1998 Insensitive Munitions & Energetic Materials Technology Symposium, San Diego, Nov. 16-19,1998.

Guanylurea dinitramide

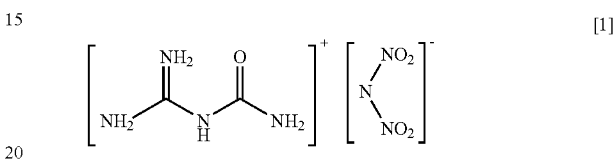

[1]

The guanylurea ion can be added to the process in various ways. A guanylurea salt can be added to the reaction mixture, for instance by the reaction mixture being mixed with an aqueous solution of the guanylurea salt. Use is suitably made of a salt that corresponds to the used nitrating acid so as not to add new anions to the mixture, for instance a sulphate or nitrogen salt when the nitrating acid is $HNO_3/H_2SO_4$. Another method is to react the reaction mixture with guanylurea which is then protonated to the guanylurea ion by spent acid in the reaction mixture. The reaction mixture can then be mixed, for example, with an aqueous solution of guanylurea.

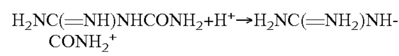

$$H_2NC({=}NH)NHCONH_2+H^+\rightarrow H_2NC({=}NH_2)NHCONH_2^+$$

A further method is to react cyanoguanidine with the reaction mixture, in which the guanylurea ion is formed in situ by the nitrile function being hydrolysed to amide function in the acidic environment.

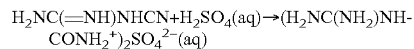

$$H_2NC({=}NH)NHCN+H_2SO_4(aq)\rightarrow(H_2NC(NH_2)NHCONH_2^+)_2SO_4^{2-}(aq)$$

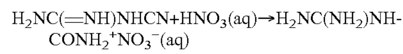

$$H_2NC({=}NH)NHCN+HNO_3(aq)\rightarrow H_2NC(NH_2)NHCONH_2^+NO_3^-(aq)$$

The reaction mixture is suitably mixed with an aqueous slurry of cyanoguanidine. The temperature is raised when the acid is diluted by the aqueous slurry, which starts the hydrolysis.

The formed guanylurea ion immediately reacts with the dinitramidic acid in the reaction mixture and causes a precipitate of guanylurea dinitramide.

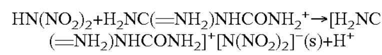

$$HN(NO_2)_2+H_2NC({=}NH_2)NHCONH_2^+\rightarrow[H_2NC({=}NH_2)NHCONH_2]^+[N(NO_2)_2]^-(s)+H^+$$

The recovered precipitate can be used as starting material for preparation of other dinitramide salts. The precipitate can be dissolved in a basic solution, preferably an alcohol solution, during heating. A dinitramide salt with a cation from the used base can then be precipitated, for example, by cooling the solution. Preferably, KOH is used as the base. Potassium dinitramide, which is then obtained, can be used as oxidiser in various propellant and pyrotechnic charges and can in turn easily be converted to other dinitramide salts, for instance ammonium dinitramide ADN, by simple ion exchange processes. Such ion exchange processes are disclosed in EP 843 647 for example. In the reaction with a base, guanylurea is set free again and can be recirculated to the process for precipitation of the dinitramide ion from the reaction mixture as described above.

The spent acid that remains after separation of the precipitate from the reaction mixture can be reprocessed in prior-art manner by denitration and concentration for recovery of $HNO_3$ and $H_2SO_4$ respectively or another used nitration-promoting strong acid. The recovered acids can be used for preparation of a new nitrating acid mixture.

The invention will now be described by way of examples.

Example 1

A batch of 12 kg ammonium sulfamate was nitrated in a batch reactor with nitrating acid consisting of fuming $HNO_3$ and 100% $H_2SO_4$. The weight ratio of $HNO_3/H_2SO_4$ was 7:3 and the weight ratio of substrate/nitrating acid was about 1:5. The temperature was kept between −40° C. and −25° C. during nitration that lasted for about 30 min. Then the reaction mixture was poured into a mixture of 6 kg cyanoguanidine in about 60 l of water. The aqueous mixture had a temperature of 15° C. and at this temperature was a slurry of partially dissolved and partially suspended cyanoguanidine. When the reaction mixture was mixed with the slurry, the temperature quickly rose to about 70° C., and after a short while a precipitate begun to precipitate. The mixture was cooled to 25° C., after which the precipitate was filtered off and washed with water. The precipitate consisted of guanylurea dinitramide. The spent acid from filtration was passed to spent acid recovery for reprocessing, comprising denitration for recovery of $HNO_3$ and concentration for recovery of $H_2SO_4$.

Part of the recovered guanylurea dinitramide was used for preparation of potassium dinitramide (KDN). A solution containing about 30% by weight of water, 60% by weight of ethanol and 10% by weight of KOH was heated to about 50° C., and guanylurea dinitramide was dissolved in this solution during continued heating. After about 15 min, the solution contained 30% by weight of dissolved guanylurea dinitramide, and cooling of the solution was started. KDN began to crystallise and the mixture was further cooled to 15-20° C., after which crystallised KDN was filtered off and washed with ethanol. The mother liquor from crystallisation contained guanylurea and was kept for recovery and use in the process for precipitation of the dinitramide ion in nitration.

Part of the ethanol-moist potassium dinitramide from filtration was used immediately for preparation of ammonium dinitramide (ADN) in the same way as described in Example 1 in EP 843 647.

Example 2

Example 1 was repeated, with the difference that the reaction mixture from nitration was poured into an aqueous solution of guanylurea nitrate. The solution contained 15% by weight of guanylurea nitrate and had been cooled to about 12° C. The temperature rose when the reaction mixture was poured into the solution and the mixture was cooled to 25° C. Precipitation of guanylurea dinitramide started practically immediately, and the precipitate was filtered off and washed with water. The spent acid was passed to spent acid recovery.

The invention claimed is:

1. A method of producing guanylurea dinitramide, comprising (1) nitrating an initial compound with a nitrating acid mixture, the nitrating acid mixture comprising sulphuric acid and nitric acid, to form dinitramidic acid in an acidic reaction mixture, (2) adding a guanylurea ion to the acidic reaction mixture to form a salt of dinitramidic acid and (3) precipitating guanylurea dinitramide from the acidic reaction mixture, which mixture is acidic at the time of precipitation.

2. The method of claim 1, wherein the guanylurea ion is added by cyanoguanidine being reacted by hydrolysis with the acid reaction mixture to form protonated guanylurea in situ.

3. The method of claim 2, wherein the cyanoguanidine is added to the acid reaction mixture as an aqueous slurry of cyanoguanidine.

4. The method of claim 1, wherein guanylurea dinitramide is separated from the acid reaction mixture.

5. The method of claim 2, wherein guanylurea dinitramide is separated from the acid reaction mixture.

6. The method of claim 3, wherein guanylurea dinitramide is separated from the acid reaction mixture.

7. A method of producing a salt of dinitramidic acid comprising:

(a) nitrating ammonium sulfamate with a mixture of $HNO_3$ and $H_2SO_4$ to form a dinitramide ion in an acid reaction mixture;

(b) mixing and reacting cyanoguanidine with the acid reaction mixture from step (a) to form a guanylurea ion in the acid reaction mixture to form a precipitating salt of dinitramidic acid, guanylurea dinitramide, in the acid reaction mixture; and (c) separating the precipitated salt of dinitramidic acid formed in step (b) from the acid reaction mixture.

8. A method of producing a salt of dinitramidic acid comprising:

(a) nitrating ammonium sulfamate with a mixture of $HNO_3$ and $H_2SO_4$ to form dinitramide ion in an acid reaction mixture;

(b) mixing guanylurea nitrate with the acid reaction mixture from step (a) to form a precipitate salt of dinitramidic acid, guanylurea dinitramide, in the reaction mixture and;

(c) separating the precipitated salt of dinitramidic acid from step (b) from the acid reaction mixture.

9. The method of claim 1, wherein the guanylurea dinitramide is used as a starting material for the preparation of other dinitramide salts.

10. The method of claim 2, wherein the guanylurea dinitramide is used as a starting material for the preparation of other dinitramide salts.

11. The method of claim 3, wherein the guanylurea dinitramide is used as a starting material for the preparation of other dinitramide salts.

12. The method of claim 5, wherein the guanylurea dinitramide is used as a starting material for the preparation of other dinitramide salts.

13. The method of claim 7, wherein the guanylurea dinitramide is used as a starting material for the preparation of other dinitramide salts.

14. The method of claim 1, wherein the added guanylurea ion is recovered and is re-used in the production of dinitramide salts.

15. The method of claim 2, wherein the added guanylurea ion is recovered and is re-used in the production of dinitramide salts.

16. The method of claim 3, wherein the added guanylurea ion is recovered and is re-used in the production of dinitramide salts.

17. The method of claim 5, wherein the added guanylurea ion is recovered and is re-used in the production of dinitramide salts.

18. The method of claim 7, wherein the added guanylurea ion is recovered and is re-used in the production of dinitramide salts.

19. The method of claim 9, wherein the added guanylurea ion is recovered and is re-used in the production of dinitramide salts.

20. The method of claim 1, wherein the initial compound is ammonium sulfamate.

* * * * *